(12) United States Patent
Waggoner et al.

(10) Patent No.: US 10,176,622 B1
(45) Date of Patent: Jan. 8, 2019

(54) FILTERING OF VIRTUAL REALITY IMAGES TO MITIGATE PLAYBACK TRANSFORMATION ARTIFACTS

(71) Applicant: Amazon Technologies, Inc., Seattle, WA (US)

(72) Inventors: Charles Benjamin Franklin Waggoner, Portland, OR (US); Yongjun Wu, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 68 days.

(21) Appl. No.: 15/414,477

(22) Filed: Jan. 24, 2017

(51) Int. Cl.
*G06T 15/10* (2011.01)
*G06T 19/00* (2011.01)
*G06T 17/20* (2006.01)

(52) U.S. Cl.
CPC ............ *G06T 15/10* (2013.01); *G06T 17/20* (2013.01); *G06T 19/006* (2013.01)

(58) Field of Classification Search
None
See application file for complete search history.

(56) References Cited

U.S. PATENT DOCUMENTS 9,473,758 B1 * 10/2016 Long .................. H04N 13/0275

OTHER PUBLICATIONS

Luckey, Palmer, Oculus Rift: Step Into the Game, Details on New display for Developer Kits, Dec. 2012, https://www.kickstarter.com/projects/1523379957/oculus-rift-step-into-the-game/posts/361519, pp. 1-12.*

Mary-Luc Champel, "The Special Challenges of Offering High Quality Experience for VR video," Power point Presentation, 2016 Annual Technical Conference & Exhibition, 15 pages.

Champel, et al., "The Special Challenges of Offering High Quality Experience for VR video," Written Presentation, 2016 Annual Technical Conference & Exhibition, 10 pages.

Pierre Routhier, "The Special Challenges of Offering High Quality Experience for VR video," Written Presentation, 2016 Annual Technical Conference & Exhibition, 20 pages.

* cited by examiner

*Primary Examiner* — Said Broome
(74) *Attorney, Agent, or Firm* — Weaver Austin Villeneuve & Sampson LLP

(57) ABSTRACT

Techniques are described for low-pass filtering image data of virtual reality content before compression based on an understanding of the relationship of the image data to a cylindrical or polygonal projection space and the resulting compression of that image data when mapped to a playback projection space.

21 Claims, 5 Drawing Sheets

FILTERING OF VIRTUAL REALITY IMAGES TO MITIGATE PLAYBACK TRANSFORMATION ARTIFACTS

BACKGROUND

Virtual Reality (VR) content is intended to provide an immersive experience in which a user is apparently surrounded by and interacts with a virtual environment constructed from actual or computer-generated images. The original source images from which VR content is constructed correspond to different views from the user's apparent location at the center of the environment (e.g., front, back, left, right, etc.). In the typical work flow by which VR content is generated, these images are combined in a process known as "stitching" to form a two-dimensional (2D) representation (using, for example, polygonal or equirectangular projection) in which each of the images corresponds to a portion of a three-dimensional (3D) shape such as, for example, a cube or a cylinder. The 2D representation is then compressed using any of a variety of encoding techniques such as, for example, H.265/High Efficiency Video Coding (HEVC) or H.264/MPEG-4 Advanced Video Coding (H.264).

When VR content is decoded for playback, the 2D representation is scaled to a playback projection space (e.g., a spherical space) resulting in compression of the image data for pixels associated with various parts of the polygonal or cylindrical projection space to fit the playback projection space. Particularly for parts of the images that are near a vertex of the polygonal projection space or the poles of a cylindrical projection space, this can result in visual artifacts such as moiré patterns and false detail that detract from the user's experience.

DETAILED DESCRIPTION

This disclosure describes techniques for low-pass filtering image data of VR content before compression based on an understanding of the relationship of the image data to its cylindrical or polygonal projection space and the resulting compression of that image data when mapped to a playback projection space. An example may be instructive.

Figure 1:
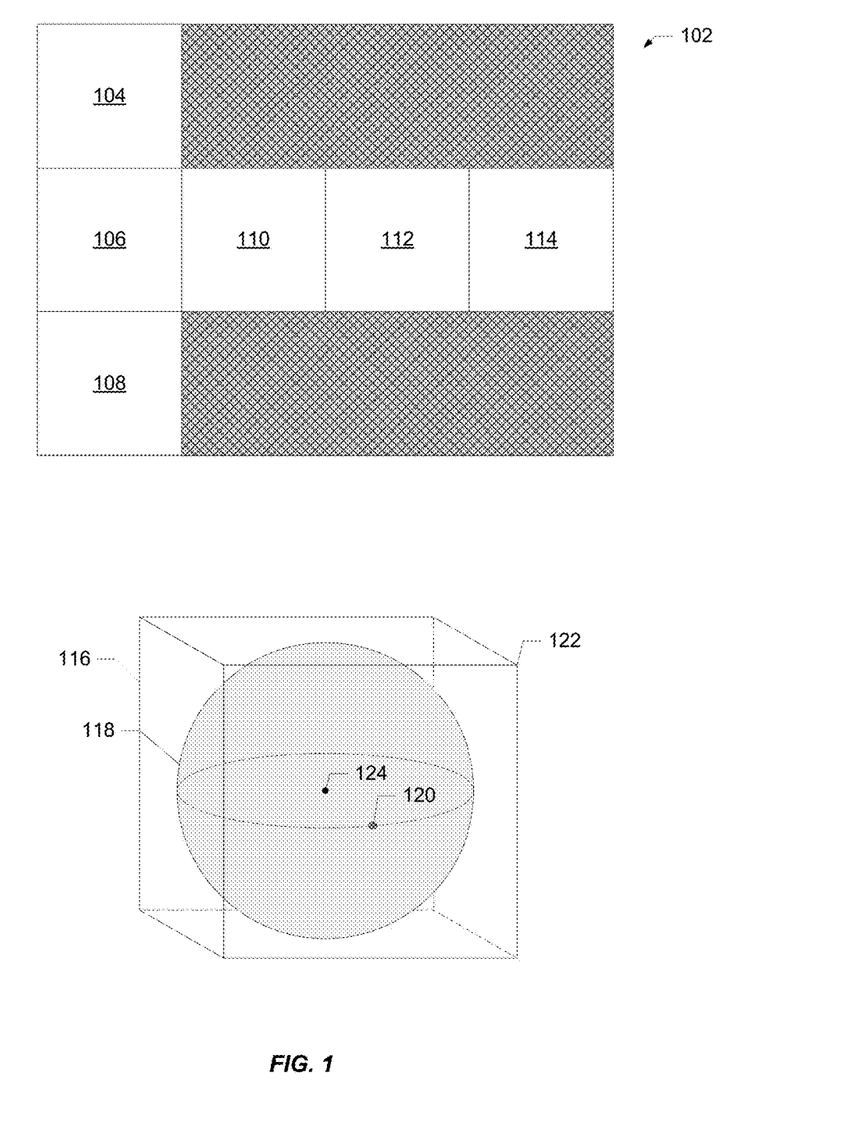
FIG. 1 illustrates an example of the filtering of VR content for particular projection spaces.

FIG. 1 shows a two-dimensional representation of VR content (102) in which six images 104-114 have been stitched together based on a polygonal projection in which each image represents one of the six faces of a cube. In this example, 2D representation 102 is a VR video frame suitable for encoding using any of a variety of codecs. Each of the images includes a rectangular array of pixels (not shown). As can be seen, the image data represented by the six images do not fill out the entire frame as represented by the darker, cross-hatched regions of the frame. Also shown in FIG. 1 is a representation of the relationship between the polygonal projection space (cube 116) represented by the images of frame 102 and a playback projection space (sphere 118) to which the image data will be scaled for rendering on a playback device (e.g., a gaming console or a VR headset).

During playback, the decoded image data are transformed to playback projection space 118 by scaling the image data to fit into fewer pixels as represented by the smaller surface area of the playback projection space 118 relative to polygonal projection space 116. This can be thought of as mapping each of the pixels in the polygonal projection space to a location on the surface of the playback projection space. The image data representing pixels near the center of each face of polygonal projection space 116 (e.g., near location 120) do not require much, if any scaling, as the two projection spaces effectively coincide or intersect at these points. However, as the scaling algorithm moves out toward the vertices of polygonal projection space 116 (e.g., vertex 122), it must scale the image data increasingly aggressively. As will be appreciated, this can result in too much information being compressed into too few pixels in playback projection space 118. This, in turn, can result in visual artifacts such as moiré patterns and false detail.

To mitigate the effects of this transformation, the image data of each of images 104-114 are filtered to remove high frequency information prior to the compression of the image data that takes place during the encoding process. The extent to which the high frequency information is filtered relates to the extent to which the image data are compressed during the scaling to playback projection space 118. According to a particular class of implementations, the filtering removes frequency components above the Nyquist limit for the original image for a given region of the image as that region is projected into the playback space. The more a region of the image is distorted by scaling, the more aggressively it is filtered to remove the higher frequencies.

The manner in which the aggressiveness of the filtering is controlled may be based on a variety of parameters. For example, the low-pass filtering of the image data may increase as a function of the distance from the center of each image (e.g., location 120), with the most aggressive filtering being done near the edges and, in particular, the vertices of polygonal projection space 116 (e.g., vertex 122). In another example, the low-pass filtering increases as a function of the distance between an image pixel (as represented by a corresponding location on the polygonal or cylindrical projection space) and the center of the projection spaces (i.e., location 124). In yet another example, the low-pass filtering increases as a function of a distance between an image pixel and the surface of playback projection space 118.

By more aggressively removing the higher frequency components of image data that experience the most compression during playback scaling, visual artifacts due to scaling may be significantly reduced.

Figure 2:
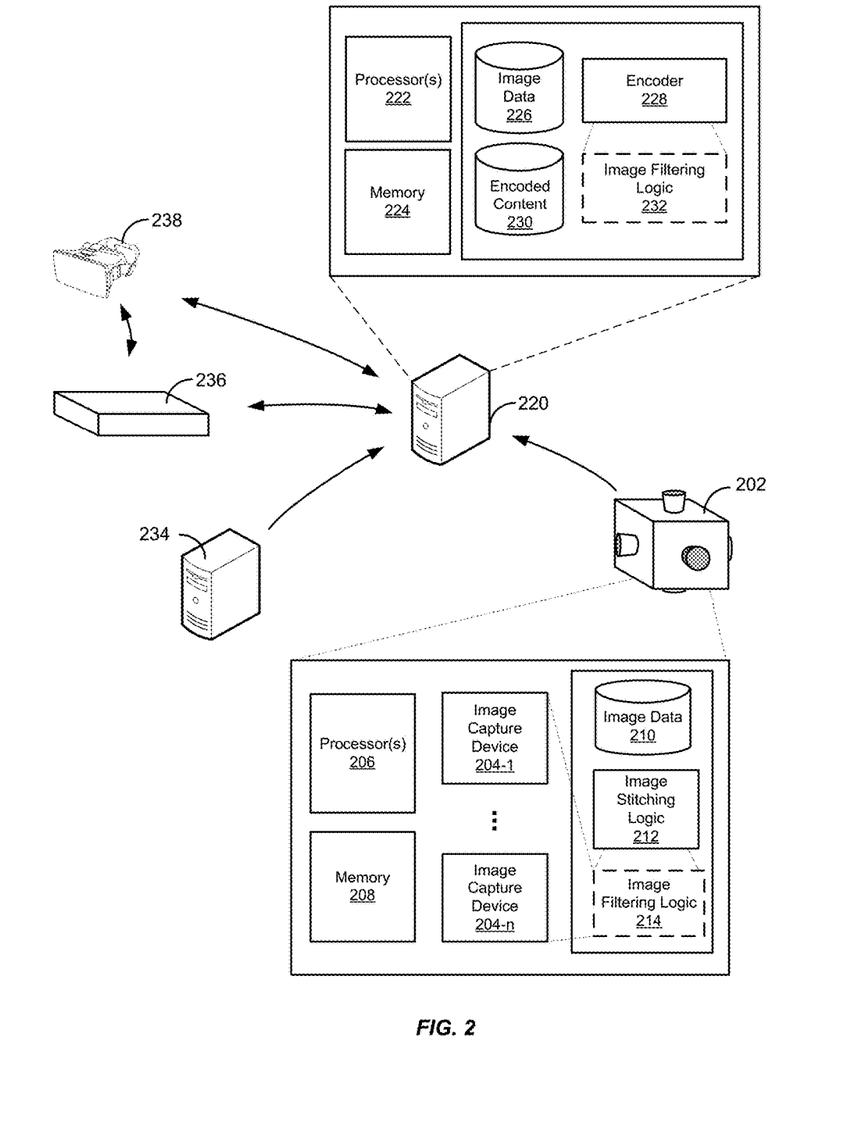
FIG. 2 is a simplified representation of a computing environment for generating VR content.

FIG. 2 illustrates an example of a computing environment for generating VR content as enabled by the present disclosure. The computing environment includes a VR camera 202 for capturing a plurality of images for each video frame of VR content using image capture devices 204-1 through 204-n where n represents, for example, the number of faces of a particular polygonal projection space employed by camera 202. The polygonal projection space may be a cube, a tetrahedron, an octahedron, a dodecahedron (i.e., a shape with 12 pentagonal faces), an icosahedron (i.e., a shape with 20 triangular faces), to name a few representative examples. Alternatively, the projection space employed by camera 202 may be a cylindrical projection space. VR camera 202 may be any of a variety of devices capable of substantially simultaneously capturing multiple images that are subsequently combined or stitched together to form VR content. Some representative examples include VR cameras from 360 Designs of Venice, Calif., HypeVR of Venice, Calif., NextVR of Laguna Beach, Calif., Lytro of Mountain View, Calif., and HeadcaseVR of West Hollywood, Calif., to name a few.

VR camera 202 includes processing resources (represented by processor(s) 206 and memory 208) for controlling operation of the various functionalities of VR camera 202 including image capture by devices 204 and combining of the captured image data (represented by data store 210) by image stitching logic 212. VR camera 202 may also include image filtering logic 214 configured to remove the high frequency components of the image data generated by VR camera 202 based on the geometry of the polygonal or cylindrical projection space as described herein. Image filtering logic 214 is shown in dashed line because, as will be discussed, the low-pass filtering of image data as enabled by the present disclosure may be performed at any point in the processing of the image data prior to the encoding of the data with the video codec being employed. This includes filtering that may be performed by the encoder as part of preliminary processing before compression of the data.

For implementations in which the low-pass filtering is performed by logic in the image capture device (e.g., VR camera 202), the filtering may be performed by stand-alone logic (e.g., logic 214) prior or subsequent to the combining of the images (e.g., by logic 212), or may be integrated with the logic that combines the images (e.g., logic 212) or even with the image capture devices (e.g., devices 204) as indicated by the diagonal dotted lines connecting the two blocks. Implementations are also contemplated in which the combination of images occurs prior to encoding in a platform or device that is separate from VR camera 202.

The image data captured by VR camera 202 is transmitted to an encoding server 220 for encoding according to any of a variety of video codecs such as, for example, H.264 or HEVC. Encoding server 220 includes processing resources (represented by processor(s) 222 and memory 224) for controlling operation of the various functionalities of encoding server 220 including the encoding of the image data of VR content (represented by data store 226) by encoder 228 to generate encoded VR content (represented by data store 230). As mentioned above, encoding server 220 may also include image filtering logic 232 configured to remove the high frequency components of image data (e.g., image data 226) based on the geometry of a polygonal or cylindrical projection space as described herein. Again, image filtering logic 232 is shown in dashed line because, again, the low-pass filtering of image data as enabled by the present disclosure may be performed at any point in the processing of the image data prior to the encoding of the data with the video codec being employed by encoder 228. The image filtering logic may be stand-alone logic on encoding server 220 (or even another platform or device) and may even be integrated with encoder 228 as part of the preliminary processing of image data prior to compression (as indicated by the diagonal dotted lines connecting the two blocks). Examples of tools that can incorporate image filtering logic as described herein include VR import tools, stitching tools, post processing tools, etc. The scope of the present disclosure should therefore not be limited in this regard with reference to the specific implementations described.

It should be noted that, although the computing environment depicted in FIG. 2 contemplates the use of a VR camera to generate the image data for the VR content encoded by server 220, implementations are contemplated in which the image data are created using computer animation tools as represented by animation server 234. And as will be appreciated, animation server 234 may include image filtering logic (not shown for clarity) that performs the low-pass filtering of the image data as enabled by the present disclosure. And as with VR camera 202 and encoding server 220, such logic may be stand-alone logic or integrated with the computer animation tools used to generate the image data.

The encoded VR content may then be provided to any of a variety of devices for rendering and display. The great diversity of these devices are represented by console 236 (e.g., a gaming console or a set top box) and VR headset 238. The content may be provided to VR headset 238 directly or via console 236. Alternatively, VR content provided to console 236 may be displayed using another type of display device (not shown). Regardless of the mode of delivery and display of the VR content, the low-pass filtering of the image data prior to compression of the image data (e.g., by encoder 228) results in the reduction of visual artifacts that would otherwise result from the transformation of the image data from a polygonal or cylindrical projection space to a playback projection space.

It should be noted that the various components of the computing environment of FIG. 2 can conform to any of a wide variety of architectures and the various functionalities may be implemented by a variety of devices. For example, the functionality and components of encoding server 200 or animation server 234 can employ one or more hardware or virtual servers and be deployed at one or more geographic locations (e.g., across different countries, states, cities, etc.). The various devices in the computing environment can communicate using a network that includes any subset or combination of a wide variety of network environments including, for example, TCP/IP-based networks, telecommunications networks, wireless networks, cable networks, public networks, private networks, wide area networks, local area networks, the Internet, the World Wide Web, intranets, extranets, etc. Multiple entities may be involved in the generation, filtering, encoding, and/or delivery of VR content and data related to the VR content, including content providers, internet service providers (ISPs), providers of content delivery networks (CDNs), etc.

It should further be noted that, despite references to particular computing paradigms and software tools herein, the computer program instructions on which various implementations disclosed herein are based may correspond to any of a wide variety of programming languages, software tools and data formats, may be stored in any type of non-transitory computer-readable storage media or memory device(s), and may be executed according to a variety of computing models including, for example, a client/server model, a peer-to-peer model, on a stand-alone computing device, or according to a distributed computing model in which various functionalities may be effected or employed at different locations. In addition, reference to particular types of media content herein is merely by way of example. Suitable alternatives known to those of skill in the art may be employed.

Figure 3:
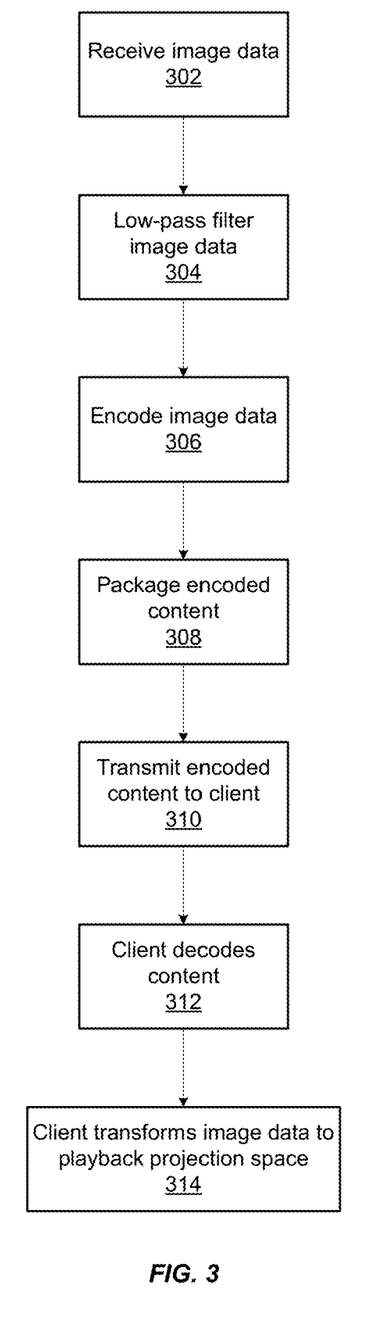
FIG. 3 is a flowchart illustrating generation of VR content.

A specific implementation will now be described with reference to the flow diagram of FIG. 3. One or more images representing a video frame of virtual content are received (302). As discussed above, the type and the number of images may vary considerably for different applications. For example, the images may correspond to different views of a real-world environment generated by the image capture devices of a VR camera. Alternatively, the images may be different views of a virtual environment created using computer animation tools. In another example, the number of images may vary considerably depending on the projection space used. A cylindrical projection space might have only one or two images, while a polygonal projection space might have as few as four and as many as 20 or more images.

Depending on the nature of the projection space, the image data are variably filtered to remove higher frequency components (304). The image data may be filtered on a per-pixel basis or in groups of neighboring pixels. And the extent to which the image data are filtered depends on the locations of the image data within the projection space and/or the extent to which the image data are compressed during scaling to the playback projection space. According to a particular class of implementations, this filtering is intended to (at least approximately) maintain the image frequency components represented in the original images in the playback projection space.

As mentioned above, the image data may be filtered prior to, subsequent to, or in conjunction with the combining (e.g., stitching) of the images into a two-dimensional or "flattened" representation or frame that includes the various views that corresponding to portions of the cylindrical projection space or faces of the polygonal projection space. This may be done in the VR camera (or using the computer animation tool), or at a point in the workflow subsequent to image capture (or creation).

The filtered image data are then encoded using any of a variety of video codecs (306) such as, for example, H.264 or HEVC. As discussed above, implementations are contemplated in which the low-pass filtering of the image data is performed by the encoder as part of the preliminary processing of the image data before compression. Once encoded, the encoded VR content is packaged as fragments of VR content (308) and distributed for rendering and display on client devices (310) during which, the client device decodes the encoded VR content (312), and scales the decoded image data (314), thereby transforming the image data from the original projection space (e.g., cylindrical or polygonal) to the playback projection space employed by the client device (e.g., spherical).

The filtering of image data as described herein may be accomplished using any of a wide variety of techniques and filter types. For example, the image data may be transformed from the spatial domain into the frequency domain using a Fourier transform, multiplied with the filter function, and then transformed back into the spatial domain. Categories of low-pass filters that may be suitable for particular implementations include Butterworth and Gaussian low-pass filters.

The transfer function H of a Butterworth low-pass filter with order n is represented by:

$$H(u, v) = \frac{1}{1 + \left[\frac{D(u, v)}{D0}\right]^{2n}} \quad (1)$$

in which (u,v) represents a point in the frequency domain as transformed from a corresponding point in the spatial domain, and D(u,v) represents the distance from that point (u,v) to the center frequency of the transformed image data. D0 represents the cutoff frequency of the filter, i.e., the frequency above which frequency components are attenuated. The transfer function H of a Gaussian low-pass filter may be represented by:

$$H(u,v) = e^{-D^2(u,v)/2D0^2} \quad (2)$$

in which the variables represent the same parameters as in equation (1). As will be appreciated Butterworth low-pass filters and Gaussian low-pass filters are two examples of categories of filters that may be used with various implementations enabled by the present disclosure.

Examples of other types of filters that may be employed with various implementations include sinc filters and box blur filters. A sinc filter is an idealized filter for which the impulse response is a sinc function in the time domain, and a rectangular function in the frequency domain. A box blur filter (also known as a box linear filter) is a spatial domain linear filter in which each pixel in the resulting image has a value equal to the average value of its neighboring pixels in the input image. Those of skill in the art will appreciate that the foregoing are merely examples of filter types that may be employed to filter image data as described herein.

Figure 4:
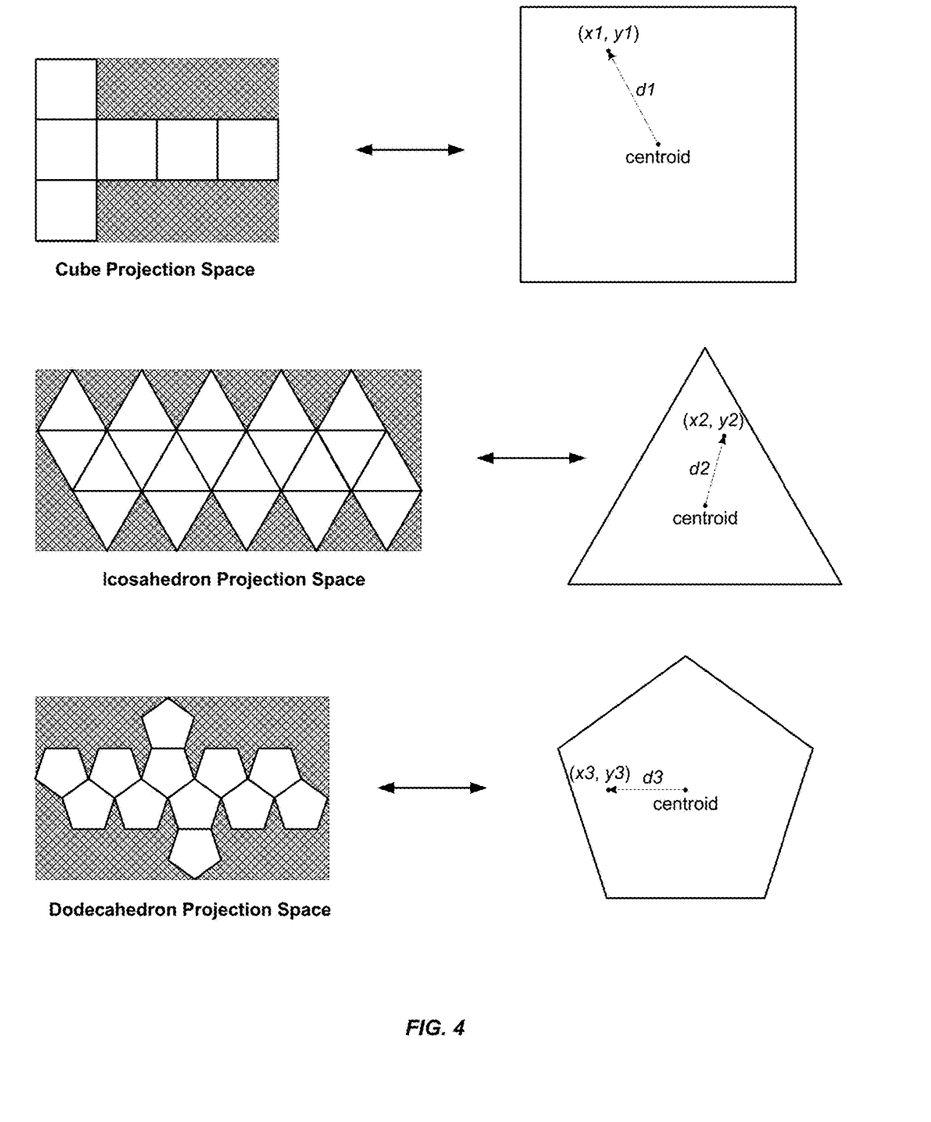
FIG. 4 illustrates examples of determining a distance for image data associated with a face of three different polygonal projection spaces.

According to a particular class of implementations, the cutoff frequency (e.g., D0) for a particular image that corresponds to one view of the VR content (e.g., one two-dimensional surface of the polygonal projection space) is based on the Nyquist limit for that image, i.e., twice the highest frequency component to be preserved in the filtered image data. However, the strength of the filtering varies with the location of the image data (e.g., pixel or group of pixels) in the projection space. Examples of how this can be determined for different polygonal projection spaces are shown in FIG. 4.

For a cubic projection space, the distance d1 between the centroid of the image data of a square face of the cube and the image data of a pixel or group of pixels at (x1, y1) may be used to weight the filtering of the corresponding data in the frequency domain. That is, the farther the image data are away from the centroid, the stronger the filtering. Similarly, the distance d2 of image data (x2, y2) from the centroid of a triangular face (e.g., of an icosahedron projection space) may be used to weight the filter. In another example, the distance d3 of image data (x3,y3) from the centroid of a pentagonal face (e.g., of a dodecahedron projection space) may be used.

The weighting of the low-pass filter may be accomplished, for example, by including a component in the filter transfer function that establishes an inverse relationship between the distance and the filter amplitude and/or cutoff frequency of the filter. The nature of this relationship may be linear or non-linear (e.g., exponential) depending on the application and/or the geometry of the projection space. Regardless, as the distance increases, the frequency components of the corresponding data are increasingly attenuated.

Figure 5:
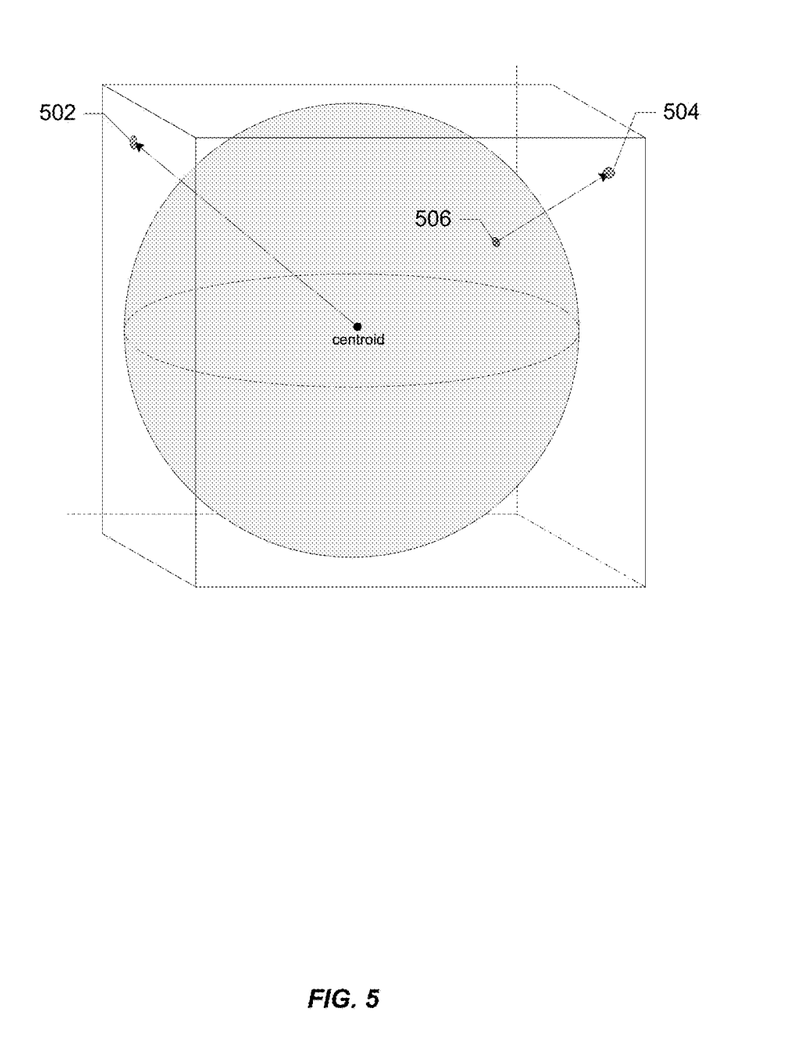
FIG. 5 illustrates examples of determining a distance for image data in a particular polygonal projection space.

It should be noted that the distance of image data from the centroid of the corresponding face of the polygonal projection space is only one way to derive weights for the transfer function of the low-pass filter being used to attenuate the high-frequency components of the image data. For example, as discussed above and as illustrated in FIG. 5, the distance to the image data (e.g., as represented by 502) from the centroid of the projection space itself might be used. In another example, the distance of the image data (e.g., 504) from the surface of the playback projection space (e.g., location 506) might also be used.

Another way to control the weighting of the low-pass filter is based on the size of the image data (i.e., pixel or groups of pixels) in the playback projection space. That is, the relationship between the area occupied by image data in the cylindrical or polygonal projection space and the area occupied by that same image data in the playback projection space employed by the target playback device (e.g., 5 to 1, 10 to 1, etc.) can be used to determine the weighting of the filter for that data. So, for example, if the scaling algorithm used by a target client device during playback to map the image data to the playback projection space is known, this information may be used to inform the weighting of the low-pass filtering.

Information about the target playback device may also be used to adjust the filtering weights. For example, more filtering can be applied without loss of quality for a lower resolution device. In another example, for a target playback device that includes a zoom capability, it may be preferable to preserve a greater amount of the higher frequency components and so the filtering could be made less aggressive based on that target device characteristic, e.g., make the filtering proportional to the maximum available zoom of the device.

For some implementations, the weighting of the transfer function may vary more in one dimension than the other. For example, a cylindrical projection space, particular one that stitches together multiple images from horizontally spaced cameras, results in significantly more compression of image data at the top and bottom of the combined and flattened image when the projection is mapped to a spherical playback projection space than at the left and right hand edges of the flattened image. That is, the pixels along the top and bottom of the equirectangular projection are mapped to just a single pixel at each pole of the spherical projection. As a result, the weighting of the filter transfer function may be made to depend more heavily (or even entirely) on the vertical axis rather than the horizontal axis.

Filter weight may be dependent on the color model and/or the type of sampling and subsampling employed by the image data. For example, in the Y'CbCr color model, luma samples (Y') (which represent the brightness of image data) typically map one-to-one with pixels, while chroma subsamples (Cb and Cr) (which represent the color of image data) map differently. For example, some encoders use 4:2:2 color in which the two chroma components of a pixel are sampled at half the rate of the luma component. Other encoders use 4:2:0 color in which each of the two chroma components are sampled at one-quarter the rate of the luma component and only on alternate lines.

In either, the chroma sample information is coarser than the luma sample information, e.g., in 4:2:0 color you have one Cr and one Cb component for each 2×2 set of pixels and a luma component for each of the 4 pixels in the set. Because the luma information will be compressed twice as much as the chroma information, the filtering of the luma components of the image data can be filtered more aggressively (e.g., twice as much) as the chroma components. And for 4:2:2 color, because the resolution of the chroma information is half as much in one dimension as it is in the other, the filtering of the chroma information can be varied based on the horizontal and vertical dimensions to take this into account. As will be appreciated, differentiating the filtering of the luma components and chroma components allows for the preservation of important chroma information that would otherwise be lost if the different resolutions of the different type of color information were not taken into account.

It will also be appreciated that, for implementations that employ the RGB color model, filtering for different components of the image data may be uniform in that each pixel includes each component, i.e., each component is represented in full resolution in each dimension. On the other hand, implementations are also contemplated in which the different components of RGB may be filtered differently.

More generally, the transfer function of the low-pass filter varies with the extent to which image data are anticipated to be compressed or combined by the transformation or scaling required to go from the cylindrical or polygonal projection space to the playback projection space. Based on the examples provided herein, those of skill in the art will understand how to determine, based on the type of projection spaces used, the relationship between the image data being filtered and the transfer function of the low-pass filter.

As mentioned above, the low-pass filtering of image data as described herein may be performed at any of a variety of points in the workflow of generating VR content between image capture/creation and the compression of the image data during encoding. It should also be noted that such filtering may actually be performed at multiple points during the work flow given that, once the image data are filtered, the high frequency components have already been removed so additional filtering would do little or no harm. Thus, low-pass filtering may be included in multiple system component provided by separate entities without risk of interference or degradation of the content.

On the other hand, the low-pass filtering of image data as described herein may result in the conservation of the various processing, storage, and/or networking resources used to generate VR content. For example, the encoding of the image data may be more efficient in that unnecessary detail is removed prior to encoding, i.e., detail is preserved where it matters and not preserved where it doesn't. Filtering of the image data prior to encoding might also be useful in cases where the content provider doesn't have control over the encoder, and so can't count on techniques such as adaptive quantization during the encoding process to reduce visual artifacts.

According to some implementations, file metadata can be included with VR content to indicate whether low-pass filtering has been performed. This would prevent unnecessary duplication of the filtering at points further along in the workflow. This information could also be used by downstream devices and processes to configure or modify their respective portions of the workflow. For example, an encoder could use this information to reduce or eliminate portions of the encoding process relating to quantization of image frames. In another example, a target playback device could use a lower quality scaling algorithm during playback to save processing resources or battery life. In another example, a graphics processing unit (GPU) of a target playback device that has different modes of processing a decoded image could select its processing mode based on this information.

According to some implementations, the image data for differently encoded versions of the same content (i.e., different resolutions or quality levels) can be low-pass filtered prior to encoding using different weighting schemes. That information can then be provided to playback devices (e.g., in a manifest) for use in the selection of fragments by variable bit rate algorithms.

While the subject matter of this application has been particularly shown and described with reference to specific implementations thereof, it will be understood by those skilled in the art that changes in the form and details of the disclosed implementations may be made without departing from the spirit or scope of the invention. Examples of some of these implementations are illustrated in the accompanying drawings, and specific details are set forth in order to provide a thorough understanding thereof. It should be noted that implementations may be practiced without some or all of these specific details. In addition, well known features may not have been described in detail to promote clarity. Finally, although various advantages have been discussed herein with reference to various implementations, it will be understood that the scope of the invention should not be limited by reference to such advantages. Rather, the scope of the invention should be determined with reference to the appended claims.

What is claimed is:

1. A computer-implemented method, comprising:
   receiving image data for each of a plurality of images, each of the images representing a view of virtual reality (VR) content;
   stitching the image data of the plurality of images to form a stitched VR content frame in which each of the images corresponds to a face of a polygonal projection space;
   filtering the image data of the stitched VR content frame with a low-pass filter to generate a filtered VR content frame, wherein the filtering of the low-pass filter for each portion of the image data varies with a distance to the portion of the image data in the polygonal projection space from a center of the corresponding face of the polygonal projection space;
   encoding the filtered VR content frame to generate an encoded VR content frame;
   packaging the encoded VR content frame with other VR content frames to generate a VR content fragment; and
   transmitting the VR content fragment to a requesting client device.

2. The method of claim 1, wherein the polygonal projection space corresponds to one of a cube, a tetrahedron, an octahedron, a dodecahedron, or an icosahedron.

3. The method of claim 1, wherein the low-pass filter comprises a Butterworth filter, a Gaussian filter, a sinc filter, or a box blur filter.

4. The method of claim 1, wherein the filtering and the encoding are both performed by an encoder.

5. A computer-implemented method, comprising:
   receiving image data representing one or more views of virtual reality (VR) content, each of the views corresponding to a portion of a projection space; and
   filtering the image data with a low-pass filter, wherein the filtering of the low-pass filter for each portion of the image data varies with a location of the portion of the image data relative to the projection space.

6. The method of claim 5, wherein the projection space is a polygonal projection space, and the location of the portion of the image data is determined relative to a centroid of a corresponding face of the polygonal projection space, or relative to a centroid of the polygonal projection space.

7. The method of claim 6, wherein the polygonal projection space corresponds to one of a cube, a tetrahedron, an octahedron, a dodecahedron, or an icosahedron.

8. The method of claim 5, wherein the projection space is a cylindrical projection space, and the location of the portion of the image is determined relative to a center of a corresponding image of a corresponding view, or relative to a centroid of the cylindrical projection space.

9. The method of claim 5, wherein the low-pass filter comprises a Butterworth filter, a Gaussian filter, a sinc filter, or a box blur filter.

10. The method of claim 5, wherein the location of each portion of the image data is characterized by first and second dimensions, and wherein the filtering of the low-pass filter for each portion of the image data varies differently in the first and second dimensions.

11. The method of claim 5, wherein each portion of the image data includes one or more pixels, wherein each pixel includes a luma component and two chroma components, and wherein the filtering of the low-pass filter for each pixel varies differently for the luma and chroma components.

12. The method of claim 5, wherein the image data are generated by a VR camera a computer animation tool, a VR import tool, or an image stitching tool.

13. The method of claim 5, further comprising:
    generating a plurality of subsets of the image data using a plurality of image capture devices of a VR camera; and
    combining the plurality of subsets of the image data to form a two-dimensional representation of the projection space.

14. The method of claim 5, further comprising encoding the image data using a video codec, wherein the encoding of the image data includes the filtering of the image data prior to compression of the image data.

15. A computer-implemented method, comprising:
    receiving image data representing a plurality of one or more views of virtual reality (VR) content, each of the views corresponding to a portion of a polygonal or cylindrical projection space; and
    filtering the image data with a low-pass filter, wherein the filtering of the low-pass filter for each portion of the image data varies with an extent to which the portion of the image data is compressed by transformation of the image data from the polygonal or cylindrical projection space to a playback projection space.

16. The method of claim 15, wherein the extent to which the portion of the image data is compressed by the transformation is determined based on an area occupied by the portion of the image data in the playback projection space.

17. The method of claim 15, wherein the low-pass filter comprises a Butterworth filter, a Gaussian filter, a sinc filter, or a box blur filter.

18. The method of claim 15, wherein each portion of the image data includes one or more pixels, wherein each pixel includes a luma component and two chroma components, and wherein the filtering of the low-pass filter for each pixel varies differently for the luma and chroma components.

19. The method of claim 15, wherein the image data are generated by a VR camera a computer animation tool, a VR import tool, or an image stitching tool.

20. The method of claim 15, further comprising:
    generating a plurality of subsets of the image data using a plurality of image capture devices of a VR camera; and
    combining the plurality of subsets of the image data to form a two-dimensional representation of the polygonal or cylindrical projection space.

21. The method of claim 15, further comprising encoding the image data using a video codec, wherein the encoding of the image data includes the filtering of the image data prior to compression of the image data.

* * * * *